United States Patent [19]
Osanai

[11] Patent Number: 5,889,256
[45] Date of Patent: Mar. 30, 1999

[54] LASER MACHINING APPARATUS WITH DEFORMABLE MIRROR

[75] Inventor: Hajime Osanai, Tokyo, Japan

[73] Assignee: Mitsubushi Denki Kabushiki Kaisha, Tokyo, Japan

[21] Appl. No.: 611,879

[22] Filed: Mar. 6, 1996

[30] Foreign Application Priority Data

May 24, 1995 [JP] Japan .................................. 7-125131

[51] Int. Cl.⁶ .................................................. B23K 26/00
[52] U.S. Cl. ............................ 219/121.74; 219/121.84; 359/846
[58] Field of Search ................. 219/121.63, 121.67, 219/121.74, 121.84, 121.75, 121.83, 121.8, 121.78; 359/846, 847, 878

[56] References Cited

U.S. PATENT DOCUMENTS

| 4,734,557 | 3/1988 | Alfille et al. ...................... 219/121.74 |
| 5,020,895 | 6/1991 | Giesen et al. ............................ 359/847 |
| 5,493,095 | 2/1996 | Bruschi et al. ..................... 219/121.75 |

FOREIGN PATENT DOCUMENTS

| 57-6804 | 1/1982 | Japan ..................................... 359/847 |
| 61-159613 | 7/1986 | Japan . |
| 63-146479 | 6/1988 | Japan . |
| 1-166894 | 6/1989 | Japan . |
| 3-128187 | 5/1991 | Japan ................................ 219/121.67 |
| 3-174995 | 7/1991 | Japan . |
| 3-189089 | 8/1991 | Japan ................................ 219/121.75 |

*Primary Examiner*—Teresa J. Walberg
*Assistant Examiner*—Gregory L. Mills
*Attorney, Agent, or Firm*—Sughrue, Mion, Zinn, Macpeak & Seas, PLLC

[57] ABSTRACT

In the present invention, a curvature variable reflector made from a material capable of elastically deforming in response to a fluid pressure is formed to a curved-face mirror by making use of a pressure by a fluid such as air so that a diameter of a laser beam coming into a converging optical member can be changed at a high speed step by step or smoothly. And by controlling the fluid pressure step by step or steplessly according to a type or thickness of a work, machining can always be performed with an appropriate laser beam diameter.

12 Claims, 7 Drawing Sheets

PRIOR ART

LASER MACHINING APPARATUS WITH DEFORMABLE MIRROR

FIELD OF THE INVENTION

The present invention relates to a transfer technology for a laser beam in a laser machining apparatus, and more particularly to a control technology for a laser beam diameter.

BACKGROUND OF THE INVENTION

FIG. 8 is a cross-sectional view illustrating a conventional type of curvature variable reflecting curved-face mirror (a concave mirror), for instance, disclosed in Japanese Patent Laid Open Publication No. 159613/1986, and FIG. 9 is a perspective view thereof.

In the figure, designated at the reference numeral 1 is an air-tight vessel, at 2 a circular opening formed on the top edge thereof, at 3 a disk-shaped film with a peripheral section thereof fixed to the vessel 1, and at 4 a sealed tight space defined by the film 3 and the vessel.

Also, at 5 is a pressure adjusting means for adjusting a pressure in the sealed space 4, which comprises an air path 6 provided in the vessel 1, a valve 7 for opening/closing the path, and a pump 8 for discharging the air in the space 4.

In the curvature variable reflecting curved-face mirror (a concave mirror) constructed as described above, when the valve 7 is opened and the pump 8 is actuated, the air in the space 4 is discharged through the air path 6, so that the pressure inside of the vessel 1 becomes lower than that outside thereof. With this feature, a pressure difference is generated between the top and rear surfaces of the disk-shaped film 3, and for this reason this disk-shaped film 3 is deflected toward inside thereof.

Then the reflecting surface 3a which is an external surface of the film formes a substantially rotative paraboloid. For this reason, if an electromagnetic wave such as a light comes into this curved-face mirror from the above direction, the electromagnetic wave is focused to almost one point by the reflecting surface 3a. Namely, the mirror can be used as a concave mirror.

Then when a focus of the reflecting surface 3a reaches a prespecified position, an air flow inside and outside of the vessel 1 can be stopped by closing the valve 7, and a form of the disk-shaped film 3 can be kept constant.

Also if it is arranged so that air can be supplied from outside into the space 4 of the vessel 1 by the pump 8, the pressure in the vessel 1 can be made higher than that outside thereof, so that the reflecting film 3a can be deflected toward outside thereof. For this reason, a convex mirror can be formed therein.

The curvature variable reflecting curved-face mirror based on the conventional technology is constructed as described above, and for this reason it is required for the purpose to change the curvature to change the pressure inside of the vessel 1 by actuating the pump 8, and a certain time is required until the curvature becomes as prespecified, so that, for instance, in a light scan type of laser machining apparatus in which a machining head moves on an X-Y plane and executes machining, in a case where the curvature variable reflecting curved-face mirror described above is used for reflecting a laser beam, it has been difficult to keep constant a diameter of a laser beam coming into a converging optical member by changing a diameter of laser beam at a high speed in association with movement of the machining head.

SUMMARY OF THE INVENTION

It is an object of the present invention to obtain a laser machining apparatus which can change a curvature of a laser beam reflecting member at a high speed, and at the same time can freely control a curvature thereof as required.

The laser machining apparatus according to the present invention comprises a laser beam reflecting member which elastically deforms according to a fluid pressure provided in a transfer path for the laser beam, a reflecting member supporting section for supporting a peripheral section of this laser beam reflecting member and also defining a space in a side opposite to a laser beam reflecting surface together with the laser beam reflecting member, a fluid supplying means for supplying a fluid into the space defined by this reflecting member supporting section, and a fluid discharging means for discharging a fluid from the space defined by the reflecting member supporting section, and the space is sealed excluding a fluid feed path and a fluid discharge path thereof, a fluid path in which a fluid supplied into the space is discharged to outside thereof is defined by contacting with a laser beam reflecting surface, and a fluid pressure required for the laser beam reflecting member to elastically deform is loaded to the laser beam reflecting surface.

Also the apparatus comprises a fluid pressure control means for continuously controlling a supplied fluid pressure, and a diameter of a laser beam coming into a converging optical member is continuously controlled by continuously changing curvature of the laser beam reflecting member due to its elastic deformation.

Also after the fluid supplied to elastically deform the laser beam reflecting member is discharged from the fluid discharge means, the fluid is used for purging inside of the laser beam transfer path as a purge air by supplying it thereinto.

Also the apparatus comprises a means for controlling curvature of the laser beam reflecting member so that, in a case where a light scan type of laser machining in which a machining head moves on an X-Y plane and executes machining is used, a diameter of a laser beam coming into the converging optical member mounted on the machining head will be kept constant irrespective of a position of the machining head.

Also the apparatus comprises a means for controlling a basic body of the machining head or the converging optical member mounted on the machining head to move in the Z-axial direction, so that a position of the minimum converging spot diameter in the Z-axial direction will be kept constant.

Also a plurality of laser beam reflecting members which elastically deform due to a fluid pressure are provided in the laser beam transfer path, so that a variable range for a laser beam diameter can be expanded.

Also a supplied fluid pressure is monitored when a pressure of a fluid supplied into the space defined by the reflecting member supporting section is being controlled, and alarm is generated or operation is stopped when a difference equal to or larger than a prespecified value is generated between the monitored fluid pressure and an instructed pressure value.

Also optimal laser beam diameters are previously registered as machining conditions and one of the laser beam diameter is selected according to a quality or a plate thickness of a work.

Other objects and features of this invention will become understood from the following description with reference to the accompanying drawings.

DESCRIPTION OF THE PREFERRED EMBODIMENTS

Description is made hereinafter for Embodiment 1 according to the present invention with reference to FIG. 1, FIG. 2, FIG. 4, FIG. 5, FIG. 6, and FIG. 7. It should be noted that, FIG. 1 is a diagram showing configuration of an optical path, a holder for curvature variable reflector and a key section of the piping system of the laser machining apparatus according to Embodiment 1 of the present invention, and FIG. 2 is a diagram showing another embodiment of the configuration of optical path and key section of the piping system of the laser machining apparatus according to Embodiment 1 of the present invention.

Figure 3:
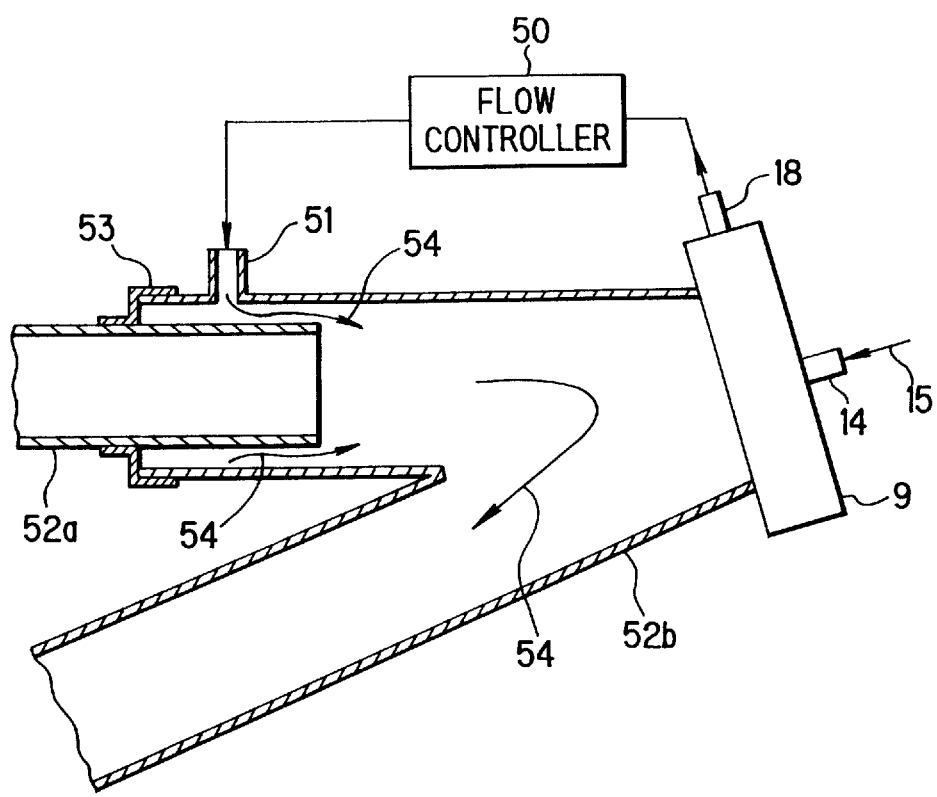
FIG. 3 is a block diagram showing a piping system and its construction in a case where air discharged from a holder for a curvature variable reflector of the laser machining apparatus according to Embodiment 1 of the present invention is used as purge air.
Figure 4:
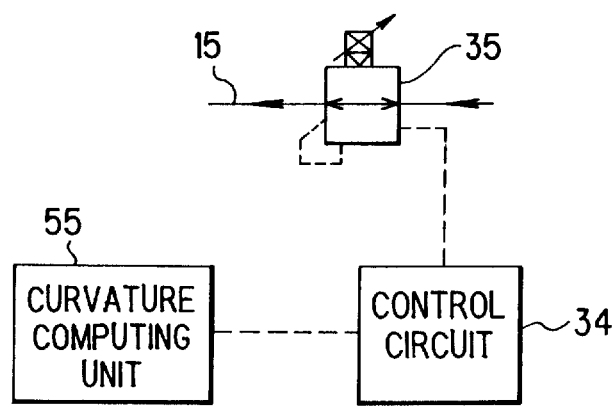
FIG. 4 is a block diagram showing a control circuit for keeping a diameter of the laser beam constant in a position of the machining lens of the laser machining apparatus according to Embodiment 1 of the present invention.
Figure 5:
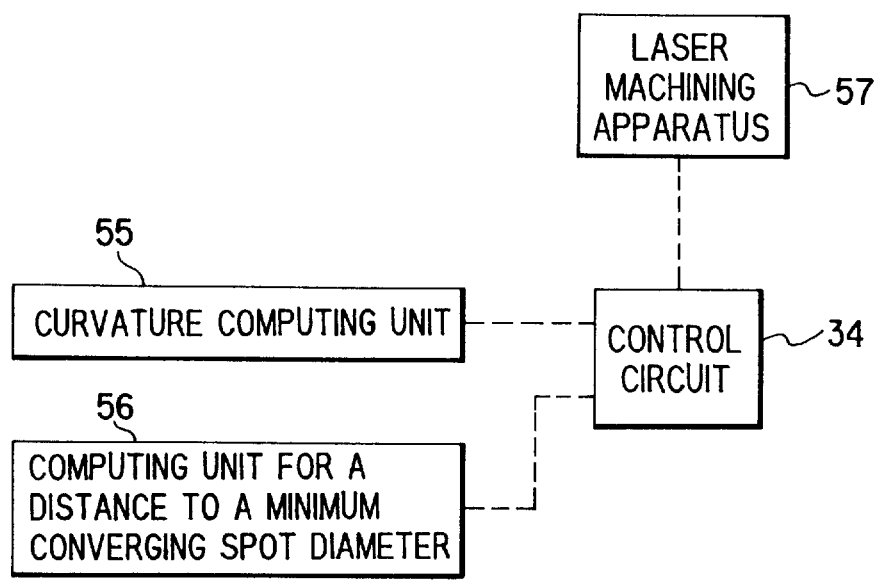
FIG. 5 is a block diagram showing a control circuit for moving a machining head in the Z-axial direction corresponding to a change of a distance from the machining lens to a minimum converging spot diameter of the laser machining apparatus according to Embodiment 1 of the present invention.
Figure 6:
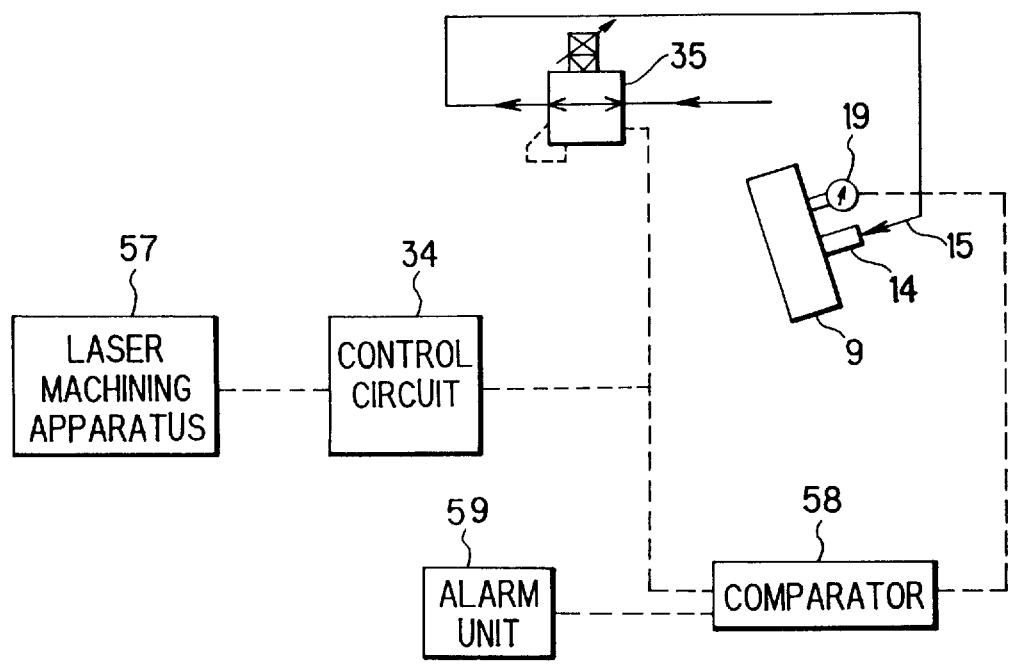
FIG. 6 is a block diagram showing an alarm circuit for an air pressure supplied to the holder for curvature variable reflector of the laser machining apparatus according to Embodiment 1 of the present invention.

Also FIG. 3 is a diagram showing the piping system and its construction in a case where air 15 discharged from the holder 9 for curvature variable reflector of the laser machining apparatus according to Embodiment of the present invention, FIG. 4 is a diagram showing a control circuit for keeping a diameter of the laser beam at a constant value at a position of the machining lens 29, FIG. 5 is a diagram showing a control circuit for moving the machining head 28 in the Z-axial direction corresponding to a change of a distance from the machining lens 29 to the minimum converging spot diameter, and FIG. 6 is a diagram showing an alarm circuit for a pressure of air 15 supplied to the holder 9 for curvature variable reflector.

Figure 1:
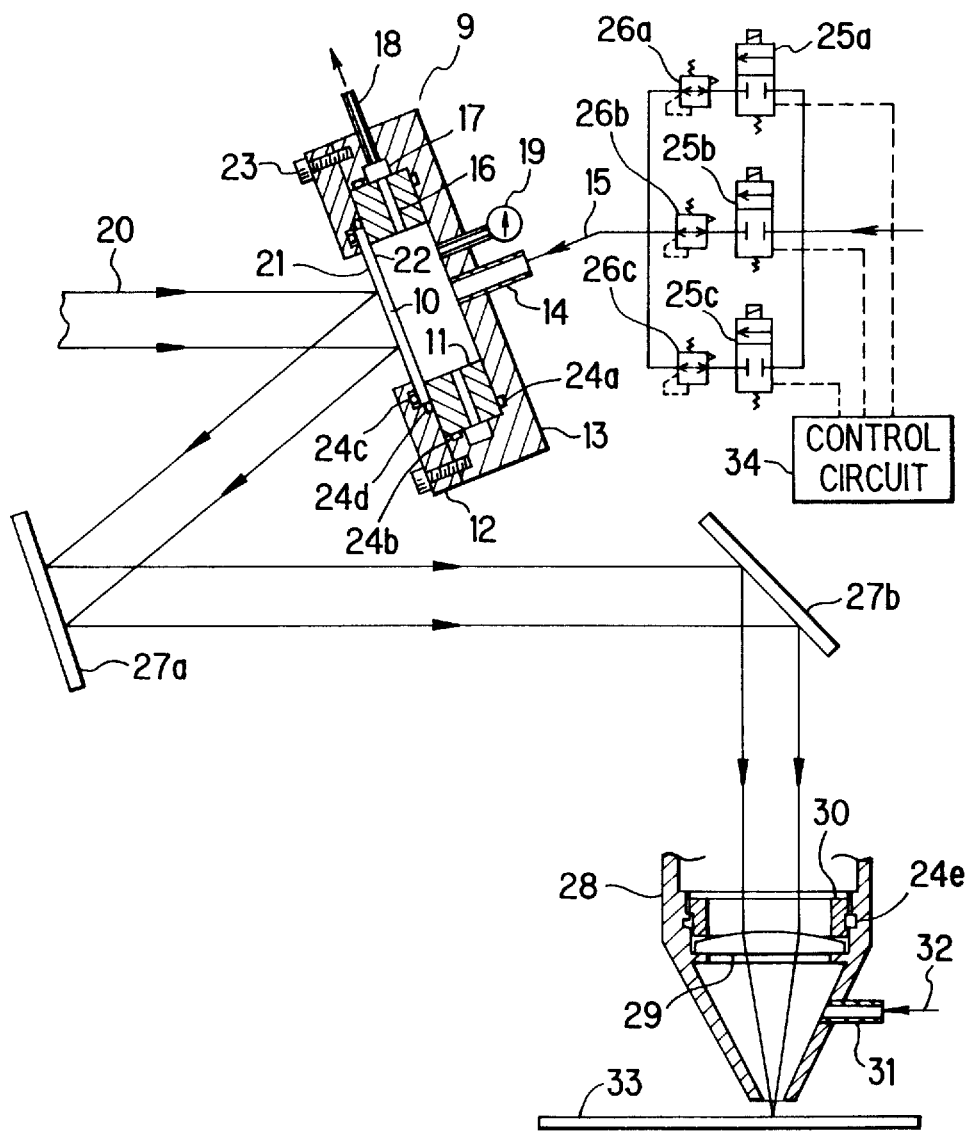
FIG. 1 is a block diagram showing an optical path configuration, a holder construction, and a piping system of a laser machining apparatus according to Embodiment 1 of the present invention.

In FIG. 1, designated at the reference numeral 9 is a holder for a curvature variable reflector, at 10 a curvature variable reflector which is a laser beam reflecting member capable of varying the curvature according to a fluid pressure such as air, at 11 a circular supporting plate which is a key section of the reflecting member supporting section supporting the peripheral portion of the curvature variable reflector 10, at 12 a holding plate for fixing the peripheral portion of the curvature variable reflector 10, at 13 an air jacket, at 14 an air inlet port provided in the central section of the air jacket 13, at 15 air, at 16 air paths provided at several positions at an even space from each other on the circular supporting plate 11, at 17 an air path provided in the air jacket 13 and formed on the peripheral section of the circular supporting plate 10, at 18 an air outlet port, at 19 a pressure gauge, at 20 a laser beam outputted from a laser oscillator not shown herein, at 21 a laser beam reflecting surface of the curvature variable reflector 10, at 22 a laser beam non-reflecting surface (a rear surface) of the curvature variable reflector 10, at 23 a fixing screw, at 24a to 24d O-rings each for keeping hermeticity thereof, at 25a, 25b, and 25c electromagnetic valves each for turning air ON/OFF, at 26a, 26b, and 26c regulators each for setting an air pressure, at 27a and 27b reflectors each for reflecting the laser beam 20, at 28 a machining head, at 29 a machining lens which is a converging optical member supported with the machining head 28, at 30 a machining lens retainer for retaining the machining lens 29, at 31 an inlet port for machining gas, at 32 gas for machining, at 24e an O-ring for sealing the gas 32 for machining, at 33 a work irradiated with laser beam 20 focused, and at 34 a control unit.

Figure 2:
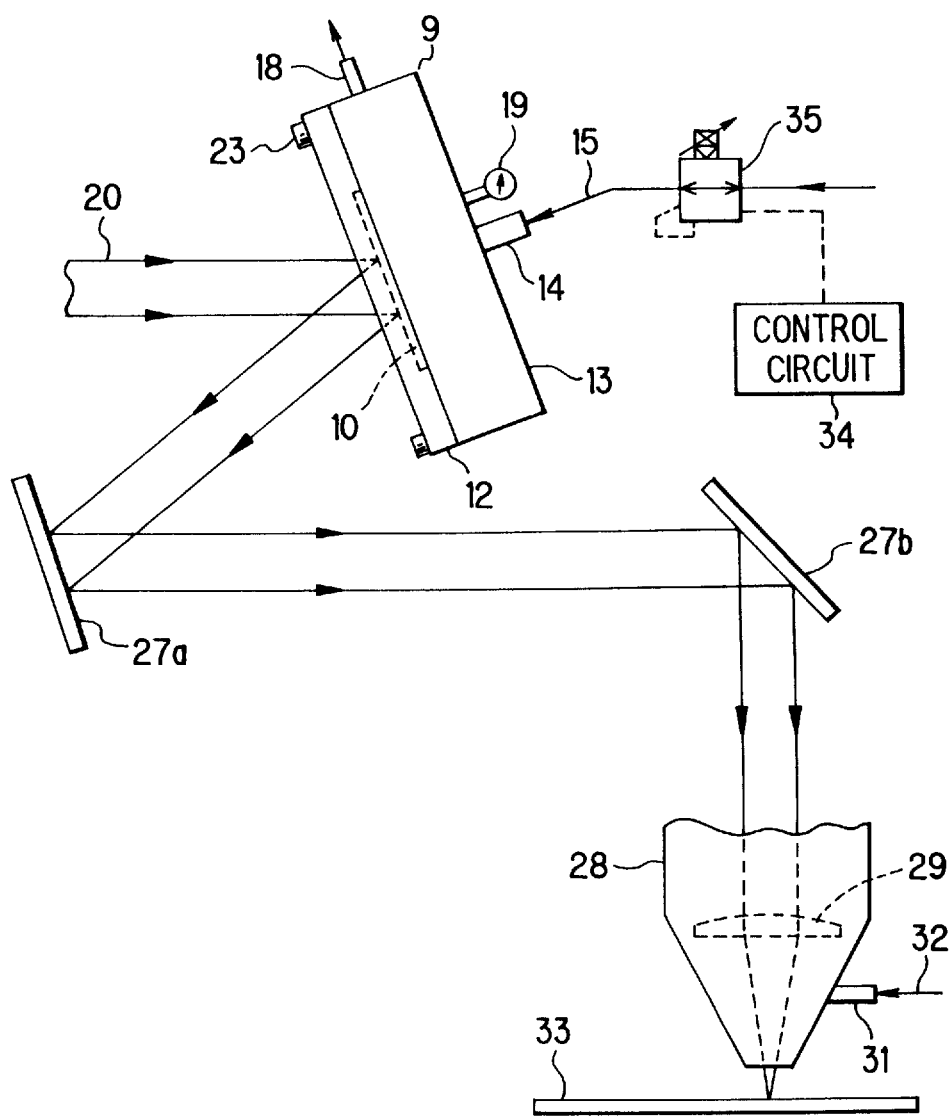
FIG. 2 is another block diagram showing configuration of an optical path as well as a piping system of the laser machining apparatus according to Embodiment 1 of the present invention.

Also in FIG. 2, the reference numeral 35 indicates an electropneumatic valve for enabling variation of supplying air pressure smoothly.

Also in FIG. 3, designated at the reference numeral 50 is a flow controller for controlling a constant flow rate irrespective of pressure due to supplied fluid, at 51 a supply port for purge air, at 52 a laser beam transfer path, at 53 a cover made with rubber for dustproofing and sealing, and at 54 an air flow.

Also in FIG. 4, the reference numeral 55 indicates a curvature computing unit for computing a curvature of the curvature variable reflector 10 required for a certain specified laser beam diameter at a position of the machining lens 29. Also in FIG. 5, the reference numeral 56 indicates a computing unit for a distance to a minimum converging spot diameter for computing a distance from the machining lens 29 to the minimum converging spot diameter, and the numeral 57 indicates a laser machining apparatus, and also in FIG. 6, the numeral 58 indicates a comparator, and the numeral 59 indicates an alarm unit.

Next, a description is made for operations. In the curvature variable reflector 10 made from a material elastically deformable due to a fluid pressure, the peripheral portion thereof is supported by the circular supporting plate 11, and also pressed to the circular supporting plate 11 with the holding plate 12 fixed with the fixing screws 23 to the air jacket 13. On the other hand, in the air jacket 13, air 15 is supplied through the air inlet port 14 provided in the central section thereof by opening any of the electromagnetic valves 25a, 25b, and 25c. Each of the regulators 26a, 26b, and 26c are installed right behind the electromagnetic valves 25a, 25b, and 25c respectively, a pressure can be switched to three stages by presetting each of the regulators. And the switching is executed according to an instruction from the control unit 3 for controlling the entire laser machining apparatus.

In laser machining such as cutting and welding, a diameter of a laser beam coming into a converging optical member such as a machining lens 29 is one of the extremely important factors because it substantially decides a minimum converging spot diameter, and there is an optimal laser beam diameter to each work according to a type (quality) or a thickness of the work 33. For this reason, better quality laser machining can be executed in stable conditions by changing the diameter of a laser beam coming into a converging optical member according to a type or thickness of the work 33.

Then, as for the air 15 supplied from the air inlet port 14, a fluid operating circuit is constructed so that the air passes through the several air paths 16 each provided equally spaced to each other on the circular supporting plate 11, and goes out to the air paths 17 provided in the peripheral section of the circular supporting plate 11, and then is discharged from the air outlet port 18 provided on one place of the air jacket 13, and this fluid pressure deforms a shape of the curvature variable reflector 10 to a spherical one, so that it can be used as a spherical mirror (in this case, a convex mirror). It should be noted that the internal diameter of the air outlet port 18 is made smaller as compared to the internal diameter of the air inlet port 14, so that a pressure can be added to the laser beam non-reflecting surface (a rear surface) of the curvature variable reflector 10 with a small quantity of flow rate. And also the curvature thereof can be switched to three stages according to an instruction from the control unit 34 because a curvature of the curvature variable reflector 10 is changed in association with a change of a fluid pressure. Also a curvature of the curvature variable reflector 10 can be changed at almost the same time when an instruction is outputted from the control unit 34 according to a fluid pressure in association with a supply rate of the fluid supplied to the fluid operating circuit. It should be noted that O-rings 24a, 24b, 24c, and 24d are used for keeping hermeticity thereof.

On the other hand, when the shape of the curvature variable reflector 10 is deformed to a spherical one, astigmatism is generated because of reflection, the laser beam 20 emitted from the laser oscillator (not shown herein) is introduced into the curvature variable reflector 10 making an incidence angle thereof as small as possible, and is transferred to the machining head 28 by the reflectors 27a and 27b. Then the laser beam is focused through the machining lens 29, and irradiated onto a work 33 near the focused position, and in this step, according to an instruction from the control unit 34, the machining head 28 or the work 33 moves and machining gas 32 supplied from the machining gas inlet port 31 is injected to the same axis as that of focused laser beam 20, so that machining such as cutting or welding can be executed. It should be noted that the O-ring 24e is used for sealing the machining gas 32, and a machining lens retainer 30 is used for retaining the machining lens 29.

As shown in FIG. 2, a pressure of the supplied air 15 can smoothly be changed because an electropneumatic valve 35 is used. For this reason, a curvature of the curvature variable reflector 10 can be changed smoothly, in other words continuously according to an instruction from the control unit 34.

Also in the laser beam transfer path, air purging is executed quite often to prevent dust or a poisonous gas from coming thereinto and to keep a stability of the laser beam, but in the configuration according to the present invention where air discharged from the air outlet port 18 is again supplied to inside of the laser beam transfer path, a purge air supply unit comprising a compressor, a drier, and a filer or the like which has been specially prepared for executing purging based on the conventional technology is not required.

As a concrete system thereof, as shown in FIG. 3, a flow rate of the air 15 discharged from the air outlet port 18 is kept constant by the flow controller 50 (a flow rate control valve), and the air is continuously supplied to the laser beam transfer path 52 through the purge air supply port 51 to keep an atmosphere in the laser beam transfer path 52 at a constant level.

When a light scan type of laser machining apparatus in which the machining head 28 moves on an X-Y plane and executes machining is used, conventionally it is impossible to keep constant a diameter of a laser beam coming into the machining lens 29 even if a collimation is used, but with the control unit 34, it is possible to keep a diameter of a laser beam coming into the machining lens 29 at a constant value by continuously changing a curvature of the curvature variable reflector 10 in association with movement of the machining head 28 in the X-Y direction.

As a concrete system thereof, as shown in FIG. 4, a beam transfer distance from the laser oscillator (not shown herein) to the machining lens 29 is computed by the control unit 34, and according to the computed transfer distance, a curvature of the curvature variable reflector 10 required for a decided laser beam diameter is computed by the curvature computing unit 55 at the position of the machining lens 29. Then, an instruction is given to the electropneumatic valve 35 for a supply air pressure to the holder 9 for the curvature variable reflector corresponding to one of the curvatures previously computed and inputted into the control unit 34. In a case where the curvature computing unit 55 is not used, it is advised to previously prepare data for curvatures required for deciding a laser beam diameter like in a case of the supply air pressure to the holder 9 of curvature variable reflector and store the data in the control unit 34.

When a diameter of a laser beam coming into the machining lens 29 is changed, a distance from the machining lens 29 to the minimum converging spot diameter slightly changes. Also in a case where a light scan type of laser machining is executed, a minimum converging spot diameter can be kept nearly constant by keeping a laser beam diameter constant even if the machining head 28 is moved. However, because a distance to the minimum converging spot diameter is likely changed, it is possible to control movement of the machining head 28 or machining lens 29 in the Z-axial direction so that a position of a minimum converging spot diameter in the Z-axial direction (upward or downward) will be kept constant.

As a concrete system, as shown in FIG. 5, in addition to the curvature computing unit 55, a computing unit 56 for computing a distance to a minimum converging spot diameter is added thereto, and the distance from the machining lens 29 to the minimum converging spot diameter is computed, and then the control unit 34 outputs an instruction to the laser machining apparatus 57 to move the machining head 28 in the Z-axial direction so that the distance thereof will be equal to the computed one.

Also a plurality of curvature variable reflectors 10 and the holder 9 thereof each are installed in the laser beam transfer paths, so that a variable range of the laser beam diameter can be expanded.

Also a pressure of the air 15 supplied to the holder 9 for curvature variable reflector is monitored, and when a difference equal to or larger than a prespecified value is generated between the monitored fluid pressure and an instructed pressure value by the control unit 34, the state is regarded as an abnormal one, and an alarm is generated or operation of the laser machining apparatus is stopped.

As a concrete system, as shown in FIG. 6, a pressure instruction value outputted from the control unit 34 to the electropneumatic valve 35 is compared to a fluid pressure actually supplied to the holder 9 for curvature variable reflector with a comparator 58, and if the value of the difference is larger than the preset one, the instruction is transferred to the alarm unit 59 to issue an alarm alerting the state.

Also there has been employed an approach for registering machining conditions such as a machining speed, a machining output, and a machining gas pressure in the control unit 34 according to a quality or a thickness of a work 33, but there is an optimal laser beam diameter most suited to particular quality or thickness of the work 33, so that the laser beam diameter is added anew to the registered items of machining conditions (the laser beam diameter to be registered should be selected from various types of laser beam diameters previously prepared). Then with the approach described above (in which the curvature computing unit 55 is used or data for laser beam diameters is prepared previously), it is possible to control the beam diameter at a position of machining lens 29 so that it will always be one of those registered in registration of machining conditions even if the machining head 28 moves.

Figure 7:
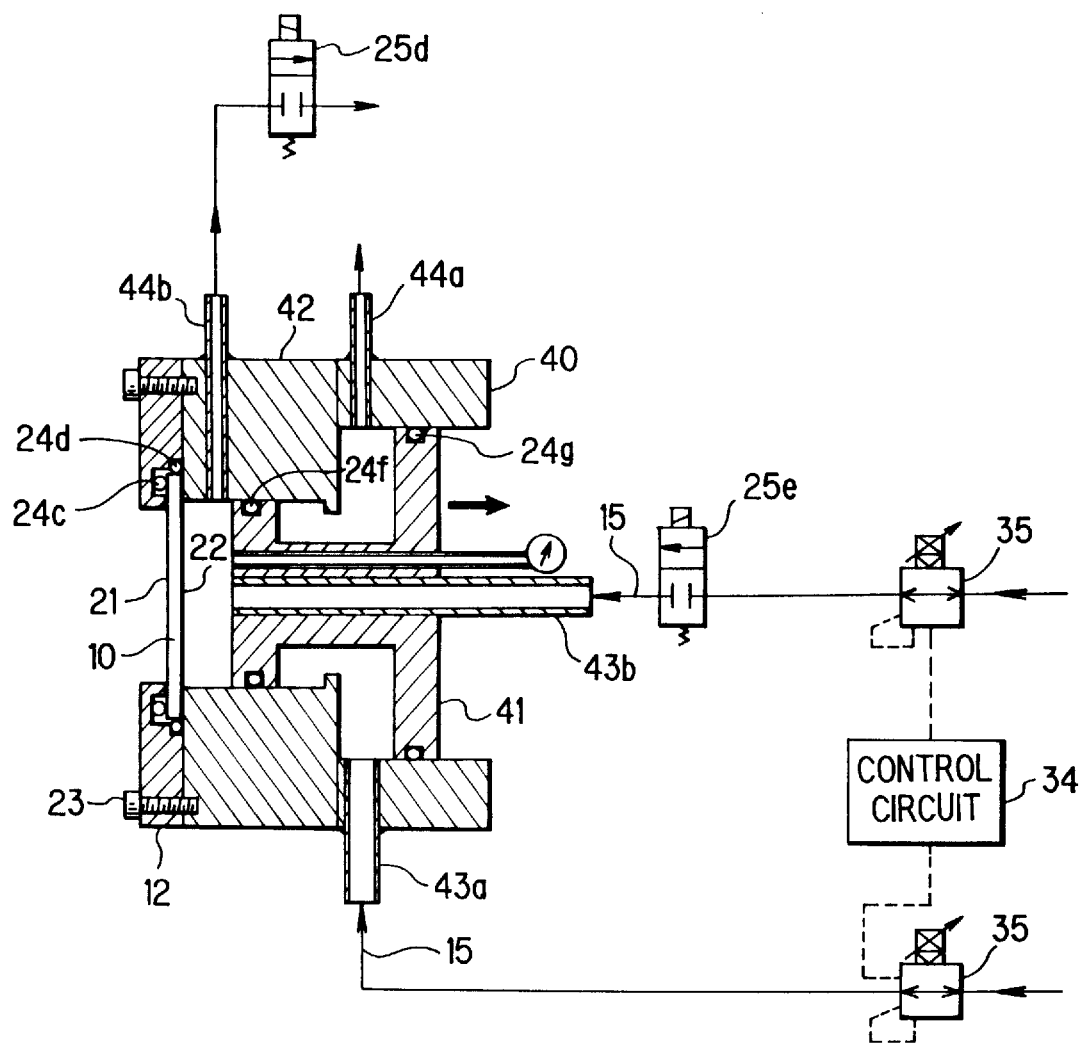
FIG. 7 is a block diagram showing the holder construction and piping system of the laser machining apparatus according to Embodiment 2 of the present invention.
Figure 8:
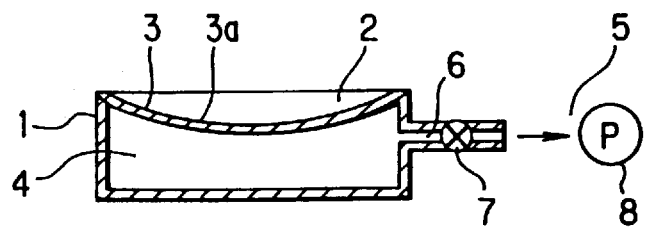
FIG. 8 is a cross-sectional view showing the conventional type of curvature variable reflecting curved-face mirror.
Figure 9:
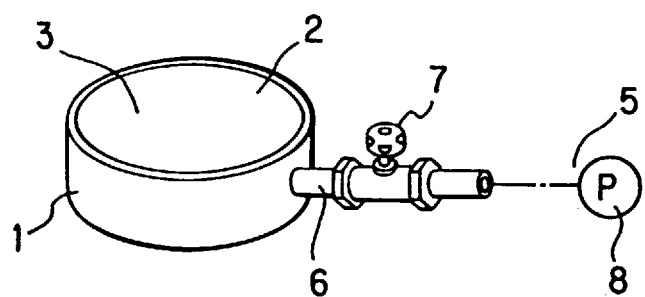
FIG. 9 is a perspective view showing the conventional type of curvature variable reflecting curved-face mirror.

In Embodiment 1, a case was described where the curvature variable reflector 10 be deformed to a spherical one, but if a construction of the holder and that of a piping system of the laser machining apparatus are made as shown in FIG. 7, an air is supplied from the air inlet port 43a and at the same time the electromagnetic valves 25d and 25e are closed, a fluid can be supplied to a space defined by the piston 41 and the cylinder (1) 40 and the piston 41 moves in the direction of the arrow in the figure sliding along the cylinder (1) 40 and the cylinder (2) 42, and thereby a pressure is loaded to the side of the laser beam non-reflecting surface (a rear surface), so that a shape of the curvature variable reflectors 10 can be changed to that of a concave mirror. It should be noted that the shape can be changed to that of a convex mirror as in Embodiment 1 by opening the electromagnetic valves 25d and 25e and supplying an air thereto from the air inlet port 43b. For this reason with the construction as described above, it becomes possible to use the curvature variable reflector as either a concave mirror or a convex mirror, so that a variable range of a laser beam diameter can be expanded.

In Embodiment 1, the curvature variable reflector 10 is a plane mirror in a state where a pressure is not loaded thereto, but the mirror may be either a concave mirror or a convex one.

Also in Embodiment 1, a wall thickness of the plane mirror is even, but the wall thickness may be changed according to a distance from the center of the plane mirror to the peripheral section to obtain an ideal spherical curvature.

Also in Embodiment 1, air is employed as a fluid for loading a pressure, but it may not necessarily be air, and other type of gas may be used for it. Also it may not necessarily be a gas, and a liquid such as water may be used for it.

Also in FIG. 1, a number of units of electromagnetic valves are three, and a pressure thereof is switched in three stages, but they are not necessarily to be three, and there is not specific restriction over the number of electromagnetic valves nor over the number of switching stages. It should be noted that if many electromagnetic valves are used, also many laser beam diameters are available, which insures better and more stable laser machining can be executed.

Also in Embodiment 1, air for loading a pressure is used also for purging, but the air may be used as a machining gas required for laser machining.

As described above, with the present invention, the laser machining apparatus comprises a laser beam reflecting member which elastically deforms according to a fluid pressure provided in a transfer path for the laser beam, a reflecting member supporting section for supporting a peripheral section of this laser beam reflecting member and also defining a space in a side opposite to a laser beam reflecting surface together with the laser beam reflecting member, a fluid supplying means for supplying a fluid into the space defined by this reflecting member supporting section, and a fluid discharging means for discharging a fluid from the space defined by the reflecting member supporting section, and the space is sealed excluding a fluid feed path and a fluid discharge path thereof, a fluid path in which a fluid supplied into the space is discharged to outside thereof is defined by contacting with a laser beam reflecting surface, and a fluid pressure required for the laser beam reflecting member to elastically deform is loaded to the laser beam reflecting surface, so that a laser beam diameter can be controlled at high velocity as required by quickly changing curvature of the laser beam reflecting member, and at the same time the laser beam reflecting member is cooled due to a supplied fluid, and heat deformation of a laser beam reflecting member due to irradiation with a laser beam is prevented.

Also the apparatus comprises a fluid pressure control means, and can continuously change curvature of the laser beam reflecting member due to its elastic deformation and can continuously control a diameter of a laser beam coming into a converging optical member by continuously controlling a supplied fluid pressure.

Also after the fluid supplied to elastically deform the laser beam reflecting member is discharged from the fluid discharge means, the fluid is supplied into the laser beam transfer path, and is used for purging inside of the laser beam transfer path as a purge air, so that configuration of a laser beam machining apparatus can be simplified and also running costs thereof can be reduced.

Also, the apparatus comprises a means for controlling curvature of the laser beam reflecting member so that, when a light scan type of laser machining in which a machining head moves on an X-Y plane and executes machining is executed, a diameter of a laser beam coming into the converging optical member mounted on the machining head will be kept constant irrespective of a position of the machining head, so that quality laser machining can be executed at its steady level.

Also, the apparatus comprises a means for controlling a basic body of the machining head or the converging optical member mounted on the machining head to move in the Z-axial direction so that a position of the minimum converging spot diameter in the Z-axial direction will be kept constant, so that quality laser machining can be executed at a steady level.

Also, a plurality of laser beam reflecting members which elastically deform due to a fluid pressure are provided in the laser beam transfer path, so that a variable range for a laser beam diameter can be expanded.

Also, a supplied fluid pressure is monitored when a pressure of a fluid supplied into the space defined by the reflecting member supporting section is being controlled and alarm can be generated or operation can be stopped when a difference equal to or larger than a prespecified value is generated between the monitored fluid pressure and an instructed pressure value.

Also, optimal laser beam diameters each are previously registered as one of machining conditions and one of the laser beam diameter is selected according to a quality or a plate thickness of a work, so that quality laser machining can be executed at its steady level.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A laser machining apparatus for machining a work by focusing thereon a laser beam emitted from a laser oscillator along a laser beam transfer path, said apparatus comprising:
   a laser beam reflecting member having an elastically deformable laser beam reflecting surface, an opposite surface, and a peripheral section;
   a reflecting member supporting section supporting said peripheral section and, together with said opposite surface of said laser beam reflecting member, defining a space;
   means for supplying a fluid into said space along a fluid feed path; and
   means for discharging said fluid from said space along a fluid discharge path;
     wherein said space, except for said fluid feed path and said fluid discharge path, is sealed; and
     wherein said laser beam reflecting surface elastically deforms according to a fluid pressure exerted thereon by said fluid in said space, thereby providing a reflecting surface curvature, said laser beam being reflected by said laser beam reflecting surface according to said reflecting surface curvature;
     wherein said laser machining apparatus further comprises a cover disposed around at least a part of said laser beam transfer path and having a supply port, and means for providing fluid output from said fluid discharge path to said supply port;
     wherein said fluid purges the inside of said laser beam transfer path covered by said cover.

2. A laser machining apparatus according to claim 1, further comprising:
   a machining head with a basic body, a converging optical member being mounted on said machining head; and
   means for keeping constant, in a Z-axial direction, a minimum converging spot diameter of said laser beam by controlling one of said basic body and said converging optical member to move in said Z-axial direction.

3. A laser machining apparatus for machining a work by focusing thereon a laser beam emitted from a laser oscillator along a laser beam transfer path, said apparatus comprising:
   a laser beam reflecting member having an elastically deformable laser beam reflecting surface, an opposite surface, and a peripheral section;
   a reflecting member supporting section supporting said peripheral section and, together with said opposite surface of said laser beam reflecting member, defining a space;
   means for supplying a fluid into said space along a fluid feed path; and
   means for discharging said fluid from said space along a fluid discharge path;
     wherein said space, except for said fluid feed path and said fluid discharge path, is sealed; and
     wherein said laser beam reflecting surface elastically deforms according to a fluid pressure exerted thereon by said fluid in said space, thereby providing a reflecting surface curvature, said laser beam being reflected by said laser beam reflecting surface according to said reflecting surface curvature;
     wherein said laser machining apparatus further comprises means for monitoring a supplied fluid pressure and generating an alarm or stopping said machining when a difference between the monitored fluid pressure and an instructed pressure value reaches a prespecified threshold.

4. A laser machining apparatus for machining a work by focusing thereon a laser beam emitted from a laser oscillator along a laser beam transfer path, said apparatus comprising:
   a laser beam reflecting member having an elastically deformable laser beam reflecting surface, an opposite surface, and a peripheral section;
   a reflecting member supporting section supporting said peripheral section and, together with said opposite surface of said laser beam reflecting member, defining a space;
   means for supplying a fluid into said space along a fluid feed path;
   means for discharging said fluid from said space along a fluid discharge path;
   a cover disposed around at least a part of said laser beam transfer path and having a supply port, and
   means for providing fluid output from said fluid discharge path to said supply port;
     wherein said space, except for said fluid feed path and said fluid discharge path, is sealed;
     wherein said laser beam reflecting surface elastically deforms according to a fluid pressure exerted thereon by said fluid in said space, thereby providing a reflecting surface curvature, said laser beam being reflected by said laser beam reflecting surface according to said reflecting surface curvature;
     wherein said fluid supplying means continuously supplies said fluid during said machining;
     wherein said laser machining apparatus further comprises a fluid pressure control means for continuously controlling said fluid pressure of said fluid in said space so as continuously to control said reflecting surface curvature; and
     wherein said fluid purges the inside of said laser beam transfer path covered by said cover.

5. A laser machining apparatus according to claim 4, wherein said laser beam transfer path includes more than one said laser beam reflecting member.

6. A laser machining apparatus according to claim 4, further comprising:
   a machining head with a basic body, a converging optical member being mounted on said machining head; and
   a control unit for controlling said fluid pressure control means;
     wherein said machining head executes said machining while moving on an X-Y plane; and
     wherein said control unit controls said fluid pressure control means so that a diameter of said laser beam coming into said converging optical member is kept constant irrespective of a position of said machining head.

7. A laser machining apparatus according to claim 6, wherein said laser beam transfer path includes more than one said laser beam reflecting member.

8. A laser machining apparatus according to claim 6, wherein a plurality of optimal laser beam diameters are previously registered, each defining a machining condition, and one of said plurality of laser beam diameters is selected according to at least one of a quality and a plate thickness of said work.

9. A laser machining apparatus according to claim 6, further comprising:

- means for keeping constant, in a Z-axial direction, a minimum converging spot diameter of said laser beam by controlling one of said basic body and said converging optical member to move in said Z-axial direction.

10. A laser machining apparatus for machining a work by focusing thereon a laser beam emitted from a laser oscillator along a laser beam transfer path, said apparatus comprising:

- a laser beam reflecting member having an elastically deformable laser beam reflecting surface, an opposite surface, and a peripheral section;
- a reflecting member supporting section supporting said peripheral section and, together with said opposite surface of said laser beam reflecting member, defining a space;
- means for supplying a fluid into said space along a fluid feed path; and
- means for discharging said fluid from said space along a fluid discharge path;
  - wherein said space, except for said fluid feed path and said fluid discharge path, is sealed;
  - wherein said laser beam reflecting surface elastically deforms according to a fluid pressure exerted thereon by said fluid in said space, thereby providing a reflecting surface curvature, said laser beam being reflected by said laser beam reflecting surface according to said reflecting surface curvature;
  - wherein said fluid supplying means continuously supplies said fluid during said machining;
  - wherein said laser machining apparatus further comprises a fluid pressure control means for continuously controlling said fluid pressure of said fluid in said space so as continuously to control said reflecting surface curvature;
  - wherein said reflecting member supporting section comprises a circular supporting plate disposed in an air jacket;
  - wherein said fluid discharge path comprises a plurality of equally spaced air paths, formed in said circular supporting plate, communicating with said space; and
  - wherein said fluid discharge path further comprises an annular air path of said air jacket, each of said plurality of equally spaced air paths communicating with said annular air path, said annular air path communicating with an air outlet port.

11. A laser machining apparatus according to claim 10, wherein said air outlet port has an inner diameter that is smaller than an inner diameter of said fluid feed path.

12. A laser machining apparatus for machining a work by focusing thereon a laser beam emitted from a laser oscillator along a laser beam transfer path, said apparatus comprising:

- a laser beam reflecting member having an elastically deformable laser beam reflecting surface, an opposite surface, and a peripheral section;
- a reflecting member supporting section supporting said peripheral section and comprising a cylinder section and a piston section in slideable contact therewith, there being a first space between said opposite surface of said laser beam reflecting member and a surface of said piston, there being a second space between said piston section and said cylinder section, said first space having a respective volume based on a position of said piston section within said cylinder section;
- means for supplying fluid into said first and second spaces, respectively, along first and second fluid feed paths;
- means for discharging said fluid from said first and second spaces, respectively, along first and second fluid discharge paths;
- said spaces, except for said fluid feed paths and said fluid discharge paths, being sealed;
- said laser beam reflecting surface elastically deforming according to a first fluid pressure exerted thereon by said fluid in said first space to provide a reflecting surface curvature, said laser beam being reflected by said laser beam reflecting surface according to said reflecting surface curvature; and
- said position of said piston being determined according to a second fluid pressure of said fluid in said second space.

* * * * *